3,584,085
PHOSPHORAMIDATES
Ludwig A. Hartmann, Wilmington, Del., assignor to Atlas
Chemical Industries, Inc., Wilmington, Del.
No Drawing. Filed July 18, 1967, Ser. No. 654,079
Int. Cl. C07f 9/24; C08g 22/44
U.S. Cl. 260—953                              8 Claims

ABSTRACT OF THE DISCLOSURE

Phosphoramidates having the general formula

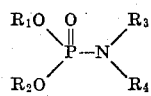

wherein $R_1$ is alkyl or haloalkyl, $R_2$ is alkyl or haloalkyl, $R_3$ is hydroxyalkyl or halogen substituted phenyl, and $R_4$ is hydrogen, alkyl, hydroxyalkyl, or halogen substituted phenyl; and flame retardant polyurethanes prepared with phosphoramidates.

---

This invention relates to polyurethane compositions and to novel phosphorus compounds suitable for the preparation of such compositions. More particularly, this invention relates to phosphoramidates and to flame retardant polyurethane compositions containing a phosphoramidate.

Phosphorus compounds have been proposed heretofore for the preparation of flame retardant polyurethane. For example, an early expedient comprised the utilization of tris (chloroethyl) phosphate. However, this technique resulted in mechanically weakened foams plagued by humidity inspired shrinkage and expansion and severe reduction of the degree of flame retardance upon aging. It has also been proposed to employ phosphorus compounds prepared by reacting $POCl_3$ with alkanolamine. However, polyurethane compositions prepared with these compounds have poor physical properties due to the incompatibility of such compounds with the polyols and isocyanates used to prepare the polyurethanes.

Accordingly, it is an object of this invention to provide novel phosphorus compounds which are suitable for the production of flame retardant polyurethanes.

It is another object of this invention to provide novel phosphoramidates which are readily compatible with polyol-isocyanatae systems and impart excellent flame-retardant properties to polyurethane foams prepared therefrom.

It is another object of this invention to provide flame retardant polyyurethanes.

It is another object of this invention to provide polyurethane foams exhibiting a high degree of flame retardancy without the sacrifice of extant desirable properties.

It is another object of this invention to provide flame retardant polyurethane foams which have excellent chemical and hydrolytic stability.

The foregoing objects and other objects which will become apparent from the following description are accomplished in accordance with this invention by providing novel phosphoramidates and flame retardant polyurethanes prepared with such phosphoramidates.

The phosphoramidates of this invention have the following general formula:

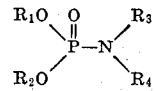

wherein $R_1$ is alkyl or haloalkyl, $R_2$ is alkyl or haloalkyl, $R_3$ is hydroxyalkyl or halogen substituted phenyl, and $R_4$ is hydrogen, alkyl, hydroxyalkyl, or halogen substituted phenyl.

The phosphoramidates of the above general formula may be prepared by reacting a dialkyl chlorophosphate with an amine according to the following general reaction:

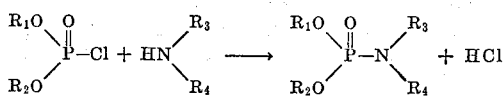

wherein $R_1$, $R_2$, $R_3$ and $R_4$ are as defined above. The reaction may be carried out by heating a mixture of the chlorophosphate and amine to a temperature from 40° C. to 125° C. for several hours. The reaction may also be conducted in the presence of a solvent such as acetonitrile.

Dialkyl chlorophosphates which may be used to prepare phosphoramidates having the aforesaid general formula include, for example, dibutyl chlorophosphate, dimethyl chlorophosphate, dioctyl chlorophosphate, methyl butyl chlorophosphate, ethyl octyl chlorophosphate, dipentyl chlorophosphate, diethyl chlorophosphate, di(chloroethyl) chlorophosphate, di(chlorobutyl) chlorophosphate, and bromomethyl butyl chlorophosphate.

Among the numerous amines which are suitable for the preparation of the phosphoramidates of this invention are diisopropanolamines, diethanolamine, monoisopropanolamine, dibutanolamine, N-hydroxyethyl octylamine, N-hydroxyethyl ethylamine, 3,4-dichloroaniline, 2,5-dibromoaniline, 2,4-dibromoaniline, N-hydroxyethyl 3,4-dichloroaniline, N-methyl ethanolamine, N-ethyl ethanolamine, and 4-amino-2-butanol.

The phosphoramidates of this invention may be used to impart flame resistance to polyurethanes. The phosphoramidates may be incorporated into the polyurethanes in any convenient manner, for example, during the preparation of the polyurethanes; but they are preferably added to one or more of the reactants prior to admixture and reaction.

Any suitable amount of the phosphoramidates may be used to impart flame retardancy to polyurethanes, but it is preferred to employ at least enough to produce a level of phosphorus content of about 0.2 percent by weight in the polyurethane. Amounts yielding a polyurethane with more than about 5 percent by weight phosphorus content are generally not required but may be used.

In respect to the condition of the phosphoramidates as embodied in the polyurethane compositions, it should be observed that their function as an additive or reactant cannot be precisely and definitely prescribed. When the phosphoramidates contain normally functional sites such as functional or free hydroxy group, it is relatively certain that the phosphoramidate becomes a part of the polymer through reaction and linkage with the polyisocyanate through the functional site. While there is little direct evidence concerning the reactivity of phosphoramidates derived from primary amines through the amino hydrogen with compounds such as polyisocyanates, it is feasible that such reactivity may exist or be induced. Consequently, it is probable that the compositions of the invention, by virtue of normally reactive or functional sites, might be characterized as reactants and ultimate constituents of the polymer which comprises the structure of the polyurethane compositions. It is feasible that the unusual improvement in terms of both flame retardancy and the maintenance of processing and ultimate product characteristics of the derived polyurethane compositions, is a direct result of the reactivity of the flame retardant compounds. It is also possible that if a chemical inter-reaction between polyurethane and flame retardant is not realized, the improved results may stem from the high degree of compatibility between the organic polyurethane and the phosphoramidates.

The polyurethanes may be either porous or non-pourous and may be prepared by any of the conventional methods known in the prior art, see for instance Kirk-Othmer, "The Encyclopedia of Chemical Technology," first supplement, pages 888, et seq. (Interscience, 1957). Briefly, this process involves the reaction of a polyisocyanate with a compound containing at least two active hydrogens. The reaction may be carried out according to the well-known "one-shot" or "prepolymer" methods. The most common active hydrogen containing compounds which are employed are the polyhydric alcohols, polyethers, and polyesters.

Illustrative polyethers include the polyoxyalkylene ether polyols which are prepared by the reaction of alkylene oxides, for example, ethylene oxide, propylene oxide, and butylene oxide, with polyhydric alcohols, for example, ethylene glycol, glycerine, pentaerythritol, hexanetriol, sorbitol, methyl glucoside, isosorbide, xyloside, glucose, sucros, lactositol, tetra-pentaerythritol, resorcinol, 6,7-dihydroxy-1-naphthol, and 2,2-bis(4-hydroxyphenyl) propane. Additional polyethers which may be used in the preparation of the polyurethanes of this invention are disclosed in U.S. Pat. No. 3,159,591, the disclosure of which is hereby incorporated into this application by reference.

Illustrative polyesters include the polyesters which are prepared by reacting a polycarboxylic acid, for example, adipic acid, sebacic acid, phthalic acid, maleic acid, and fumaric acid, with a polyhydric alcohol, for example, ethylene glycol, trimethylol propane, glycerine, pentaerythritol, and polyoxypropylene (2.2 2,2-bis(4-hydroxyphenyl) propane.

Any of a wide variety of organic polyisocyanates may be used in the preparation of the polyurethanes of this invention, including aromatic, aliphatic and cycloaliphatic polyisocyanates. Representative polyisocyanates include diphenyl methane diisocyanate, the tolylene diisocyanates, hexamethylene diisocyanate, 4-methoxy-m-phenylene diisocyanate, 1,5-naphthylene diisocyanate, 1,4-cyclohexylene diisocyanate, p-phenylene diisocyanate, toluene triisocyanate, trimethylene diisocyanate, diphenyl ether triisocyanate, and ethylidine diisothiocyanate.

The flame retardant polyurethanes of this invention are particularly suited to the formation of cellular products by causing the reaction between the active hydrogen containing compound and the polyisocyanate to take place under conditions such that a gas is generated in the reacting mass. The gas may be generated by a chemical reaction as, for example, by employing an excess of polyisocyanate over that required to react with the active hydrogen containing compound and incorporating water in the reaction mixture. Alternatively, a liquid which vaporizes at the temperature of reaction may be dispersed in the reaction mixture when the reaction components are brought together. Typical of such liquids or blowing agents are the halohydrocarbons such as trichlorofluoromethane and dichlorodifluoromethane.

It is often advantageous in the production of the flame retardant polyurethanes of this invention to include various additives in the reaction mixture such as, for example, emulsifiers, foam stabilizers, coloring agents, fillers, catalysts, and promoters.

In order that those skilled in the art may better understand how the present invention may be practiced, the following examples are given. These examples are set forth solely for the purpose of illustration and any specific enumeration of details contained therein should not be interpreted as expressing limitations of this invention. All parts and percentages are by weight, unless otherwise stated.

EXAMPLE 1

A three-liter, three-neck flask, equipped with thermometer, stirrer, and addition funnel is charged with 692 grams (5.2 moles) of diisopropanolamine, and 300 ml. acetonitrile is added to achieve a clear solution at 35°. Dibutyl chlorophosphate (458 grams, 2 moles) is then added dropwise while no external heating or cooling is applied. The addition is completed after 2 hours and 10 minutes and the temperature rises to 50° C. The reaction mixture is heated at 65° for 8 hours. The light orange-colored reaction product is then mixed with 1 liter benzene and 500 ml. water and the phases separated. The aqueous layer is washed with three 400 ml. portions of benzene and the combined benzene layers are extracted with five 250 ml. portions of water, containing some bicarbonate, and evaporated at 50–70° C., and 1 mm. of Hg for two hours. The residue is a light orange-colored clear liquid weighing 477 grams, and is essentially the dibutyl phosphoramidate of diisopropanolamine.

EXAMPLE 2

The apparatus described in Example 1 is charged with 436 grams diethanolamine (4.1 moles) and 240 ml. acetonitrile. Dibutylchlorophosphate (364 grams, 1.59 moles) is added from a dropping funnel, dropwise, at 27°–58° during 2 hours and 20 minutes. After standing at room temperature overnight, the reaction mixture is heated at 69–74° C. for 8 hours. The reaction product is mixed with 1 liter benzene and 650 ml. $H_2O$ and isolated as in Example 1. The final product is a light-colored, clear, slightly viscous liquid weighing 357 grams, and is predominantly the dibutyl phosphoramidate of diethanolamine.

EXAMPLE 3

A 250 ml. three-neck flask, equipped as described in Example 1 is charged with 29.3 grams (0.39 moles) of monoisopropanolamine and 15 ml. acetonitrile. Dibutyl chlorophosphate (34.3 grams, 0.15 mole) is added at 25–45° during 1 hour, dropwise with occasional cooling. The product is heated at 45–55° for 1 hour, mixed with 60 ml. water and 100 ml. benzene. The benzene layer is removed and the extraction repeated three times with 50 ml. benzene. The combined benzene solutions are washed with three 35 ml. portions of $H_2O$, and evaporated at 75–85° C. and 15 mm. Hg. The product is a light-colored liquid, and is essentially the dibutyl phosphoramidate of monoisopropanolamine.

EXAMPLE 4

A 2-liter, three-neck flask, equipped as described in Example 1, is charged with 162 grams (1 mole) 3,4-dichloroaniline, 300 ml. acetonitrile, and 177 ml. pyridine. Dibutyl chlorophosphate (457 grams, 2 moles) is added dropwise to the stirred solution at 20°–51° C. during a period of 1.5 hours. After standing at room temperature for 16 hours, the reaction is heated at 76° for 8 hours. The product is diluted with benzene (1 liter) and the benzene solution washed with six 200 ml. portions of water. The product is recovered after vacuum-stripping at 80–90° C. and 0.5 mm. of Hg for 2 hours. The product is a dark, slightly viscous liquid weighing 319 grams, and is the dibutyl phosphoramidate of 3,4-dichloroaniline.

EXAMPLE 5

Example 1 is repeated except that methyl octyl chlorophosphate is used in place of dibutyl chlorophosphate and N-hydroxyethyl ethylamine is used in place of 3,4-dichloroaniline. The phosphoramidate product has the formula

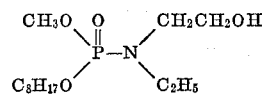

EXAMPLE 6

Example 1 is repeated except that di(chloromethyl) chlorophosphate is substituted for the dibutyl chlorophosphate and N-hydroxyethyl-3,4-dichloroaniline is substituted for the diisopropanolamine. The resulting phosphoramidate has the formula

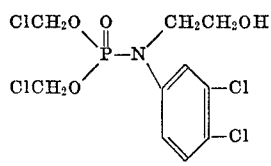

The following procedure is employed in Examples 7, 8, and 9. The ingredients of component B are stirred together in a beaker with a high-speed mechanical stirrer at room temperature. Component A is then added to the beaker and the stirring continued at room temperature for ten seconds. The contents of the beaker are then poured into a half gallon cardboard container and allowed to foam.

| Example No. | 7 | 8 | 9 |
| --- | --- | --- | --- |
| Component A: | | | |
| MONDUR MR [1] | 39.0 | 39.8 | |
| PAPI [2] | | | 47.3 |
| Component B: | | | |
| Polyoxypropylene(6)sorbitol | | | 22.45 |
| Polyoxypropylene(10)sorbitol | 34.5 | | |
| Polyoxypropylene ether of sucrose (hydroxyl number of 450) | | 35.2 | |
| Organosilicone surfactant | 0.6 | 0.6 | 0.5 |
| Dimethyl ethanolamine | 0.8 | 0.9 | 0.5 |
| Dibutyl tin dilaurate | 0.1 | 0.1 | |
| Product of Example 4 | 10.0 | 10.0 | |
| Product of Example 2 | | | 14.95 |
| Trichlorofluoromethane | 15.0 | 15.0 | 14.0 |
| Tetramethylguanidine | | | 0.3 |

[1] Diphenylmethane diisocyanate.
[2] Polymethylene polyphenylisocyanate.

The polyurethane foams of the foregoing illustrative examples had the following properties:

| Example No. | 7 | 8 | 9 |
| --- | --- | --- | --- |
| Density (lbs./ft.$^3$) | 2.02 | 2.18 | 1.94 |
| Heat distortion point (° F.) | 288 | 410 | |
| Humid aging [1] (percent volume change): | | | |
| 1 day | +14 | +13 | +9 |
| 7 days | +5 | +9 | +6 |
| 14 days | +1.6 | +9 | +14 |
| 28 days | +1.6 | +8 | +17 |
| Flammability (seconds), ASTM 1692 | 30 | 30 | 38 |
| Flammability (inches), ASTM 1992 | ½ | ½ | ⅝ |

[1] 70° C. and 100% relative humidity.

Having thus described the invention, what is desired to be secured by Letters Patent is:

1. A compound of the general formula

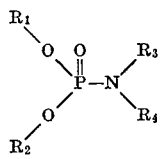

wherein $R_1$ contains from 1 to 8 carbon atoms and is selected from the group consisting of alkyl groups, chloro alkyl groups, and bromo alkyl groups; $R_2$ contains from 1 to 8 carbon atoms and is selected from the group consisting of alkyl groups, chloro alkyl groups, and bromo alkyl groups; $R_3$ contains from 1 to 8 carbon atoms and is selected from the group consisting of hydroxy alkyl groups, dichloro substituted phenyl groups, and dibromo substituted phenyl groups; and $R_4$ is selected from the group consisting of hydrogen, alkyl groups containing from 1 to 8 carbon atoms, chloro substituted phenyl groups and bromo substituted phenyl groups.

2. A compound of the general formula

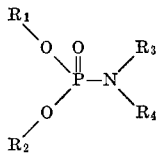

wherein $R_1$ contains from 1 to 8 carbon atoms and is selected from the group consisting of alkyl groups, chloro alkyl groups, and bromo alkyl groups; $R_2$ contains from 1 to 8 carbon atoms and is selected from the group consisting of alkyl groups, chloro alkyl groups, and bromo alkyl groups; $R_3$ is selected from the group consisting of dichloro substituted phenyl groups and dibromo substituted phenyl groups; and $R_4$ is selected from the group consisting of hydrogen, alkyl groups having from 1 to 8 carbon atoms, hydroxy alkyl groups having from 1 to 8 carbon atoms, chloro substituted phenyl groups, and bromine substituted phenyl groups.

3. A compound of claim 1 wherein $R_1$ contains from 1 to 4 carbon atoms and is selected from the group consisting of alkyl groups, chloro alkyl groups, and bromo alkyl groups; $R_2$ contains from 1 to 4 carbon atoms and is selected from the group consisting of alkyl groups, bromo alkyl groups, and chloro alkyl groups; $R_3$ is selected from the group consisting of hydroxy alkyl groups containing from 1 to 4 carbon atoms, dichloro substituted phenyl groups, and dibromo substituted phenyl groups; and $R_4$ is selected from the group consisting of hydrogen, alkyl groups having from 1 to 4 carbon atoms, chloro substituted phenyl groups and bromo substituted phenyl groups.

4. A compound of claim 3 wherein $R_1$ is an alkyl group containing from 1 to 4 carbon atoms and $R_2$ is an alkyl group containing from 1 to 4 carbon atoms.

5. A compound of claim 4 wherein $R_1$ and $R_2$ are butyl and $R_3$ is a hydroxypropyl and $R_4$ is hydrogen.

6. A compound of claim 1 wherein $R_1$ is methyl, $R_2$ is octyl, $R_3$ is hydroxyethyl, and $R_4$ is ethyl.

7. A compound of claim 2 wherein $R_1$ and $R_2$ are chloromethyl, $R_3$ is dichlorophenyl, and $R_4$ is hydroxyethyl.

8. The compound of claim 2 wherein $R_1$ and $R_2$ are butyl; $R_3$ is 3,4-dichlorophenyl; and $R_4$ is hydrogen.

References Cited

UNITED STATES PATENTS 3,004,005  10/1961  Malz et al. _____ 260—959

FOREIGN PATENTS 1,406,127  6/1965  France _____ 260—959

CHARLES B. PARKER, Primary Examiner

A. H. SUTTO, Assistant Examiner

U.S. Cl. X.R.

260—2.5, 45.9, 77.5, 959, 960, 984